(12) United States Patent
Braun et al.

(10) Patent No.: US 7,203,690 B2
(45) Date of Patent: Apr. 10, 2007

(54) SYSTEMS AND METHODS FOR TRACKING ASSETS

(75) Inventors: Richard A. Braun, Mechanicsville, VA (US); Matthew L. Overstreet, Richmond, VA (US)

(73) Assignee: Capital One Financial Corporation, Falls Church, VA (US)

(*) Notice: Subject to any disclaimer, the term of this patent is extended or adjusted under 35 U.S.C. 154(b) by 237 days.

(21) Appl. No.: 10/158,009

(22) Filed: May 31, 2002

(65) Prior Publication Data

US 2003/0225746 A1    Dec. 4, 2003

(51) Int. Cl.
*G06F 17/00* (2006.01)
(52) U.S. Cl. ............... 707/101; 707/102; 707/203; 707/204
(58) Field of Classification Search ............ 707/1–10, 707/100–104.1, 200–206
See application file for complete search history.

(56) References Cited

U.S. PATENT DOCUMENTS

| | | | |
|---|---|---|---|
| 5,109,486 A | 4/1992 | Seymour | ............... 395/200 |
| 5,121,495 A * | 6/1992 | Nemes | ..................... 707/3 |
| 5,463,775 A | 10/1995 | DeWitt et al. | ......... 395/184.01 |
| 6,151,643 A | 11/2000 | Cheng et al. | ................ 710/36 |
| 6,529,784 B1 * | 3/2003 | Cantos et al. | ............... 709/203 |
| 6,775,660 B2 * | 8/2004 | Lin et al. | ..................... 707/3 |
| 6,778,987 B1 * | 8/2004 | Wynblatt et al. | ............ 707/10 |

* cited by examiner

*Primary Examiner*—Isaac Woo
(74) *Attorney, Agent, or Firm*—Finnegan, Henderson, Farabow, Garrett & Dunner, LLP (57) ABSTRACT

Methods and systems consistent with the present invention track assets by collecting information from assets. Information for tracking assets is collected based on a query. The person creating the query specifies a lifetime, a scope, and one or more parameters for collecting the information. The lifetime indicates a period of time for maintaining the results of the query in storage. When the lifetime expires, the results of the query are removed from the storage. When a query is created, a server updates a query index and creates temporary storage space for the query's results. Periodically, the client polls the server and accesses the query index to determine whether any queries are pending for that client. The client collects the information from the appropriate assets and provides the results to the server. The server then stores the results in the temporary storage space.

8 Claims, 7 Drawing Sheets

| Query Index Number | Query Scope | Lifetime |
|---|---|---|
| 0000001 | OU.RIC.COS | 1/1/02, 1/2/02 |
|  |  |  |
|  |  |  |
|  |  |  |
|  |  |  |
|  |  |  |
|  |  |  |
|  |  |  |

SYSTEMS AND METHODS FOR TRACKING ASSETS

DESCRIPTION OF THE INVENTION

1. Field of the Invention

The present invention relates to managing assets for an enterprise and, more particularly, asset tracking of hardware and software for an enterprise.

2. Background of the Invention

Enterprises often must manage a number of tangible assets, such as personal computers, laptop computers, and software applications. Typically, this requires collecting detailed information about hardware and software for each asset, which is a tedious and time consuming process. For example, a typical personal computer has approximately 30,000 files and over 100,000 registry and configuration settings.

Conventionally, information for tracking assets is manually collected from each asset individually and compiled into a database, such as a relational database. Unfortunately, the database is difficult to manage and often includes inaccurate information. For example, as the number of assets in an enterprise increase, the size of the database increases dramatically. As a result, enterprises must often choose to ignore significant amounts of information in order to limit the size of the database. Thus, the database can only provide a partial inventory of the assets in the enterprise.

In addition, since the database relies upon information that is manually collected from each asset, the information may be inaccurate or may not reflect a change in the configuration of an asset. Thus, in many instances, known systems do not provide the information requested, or provide inaccurate information.

It is therefore desired to provide methods, systems, and apparatus that overcome these and other shortcomings of the prior art.

SUMMARY OF THE INVENTION

In accordance with an aspect of the invention, a method of tracking a configuration of an asset is provided. A request for information indicating the configuration the asset is received at a server. Based on the request, a lifetime for the information identified at the asset is identified. A query is distributed to the asset based on the request. Information at the asset is identified based on the query. The information identified at the asset and the lifetime is received at the server. At least one table is created at the server based on receiving the information identified at the asset. The information is stored in the table. The table is then removed based on the lifetime.

In accordance with another aspect of the invention, a system comprises a client and a server. The client requests to provide information indicating a configuration of an asset and provides the information indicating the configuration of the asset. The server receives a request having a lifetime, stores the information indicating the configuration of the asset in at least one table based on the lifetime, and removes the table as a function of the lifetime.

In accordance with another aspect of the invention, an asset comprises: program code for requesting to provide information indicating a configuration of the asset, for receiving a query requesting the information indicating the configuration of the asset, for determining a scope of the query, for collecting the requested information based on the query and the scope, and for providing the requested information; and a processor to execute the program code.

In accordance with another aspect of the invention, a server comprises: program code for creating a query requesting information indicating a configuration of an asset, for identifying a lifetime for the requested information, for receiving the requested information, for storing the requested information in at least one table based on the lifetime, and for removing the table as a function of the lifetime; and a processor to execute the program code.

In accordance with yet another aspect of the invention, a server comprises a first module to generate a query requesting information indicating a configuration of an asset and a lifetime for the requested information. A communications interface receives the requested information from the asset. A storage module creates at least one table for storing the requested information in response to the communications interface receiving the requested information and removes the table as a function of the lifetime. An interface module provides the requested information stored in the table.

Additional features of the invention will be set forth in part in the description which follows, and in part will be obvious from the description, or may be learned by practice of the invention. The features of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the Figures.

DETAILED DESCRIPTION

Methods and systems consistent with the present invention track assets by collecting information from assets. An asset may be any item of hardware or software. For example, hardware assets may any tangible item, such as a personal computer, a laptop computer, a mobile phone or personal digital assistant. Software assets include computer programs, such as an application, or an operating system, and documents created by an application.

Information for tracking assets is collected based on a query. The person creating the query specifies a lifetime, a scope, and one or more parameters for collecting the information. The lifetime indicates a period of time for maintaining the results of the query in storage. When the lifetime expires, the results of the query are removed from the storage. The scope identifies the assets on which information is requested. The parameters provide a criteria for the information requested in the query.

When a query is created, a server updates a query index and creates temporary storage space for any results of the query. Periodically, the client polls the server and accesses the query index to determine whether any queries are pending for that client. The client collects the information from the appropriate assets and provides the collected information as results to the server. The server then stores the results in the temporary storage space, for example, in a table. Reports may be created based on the results stored in the temporary storage space. Based on the lifetime specified in the query, the server removes the results from the temporary storage space.

It is to be understood that both the foregoing general description and the following detailed description are exemplary and explanatory only and are not restrictive of the invention, as claimed. Reference will now be made in detail to exemplary embodiments of the invention, examples of which are illustrated in the accompanying drawings. Wherever possible, the same reference numbers will be used throughout the drawings to refer to the same or like parts.

Figure 1:
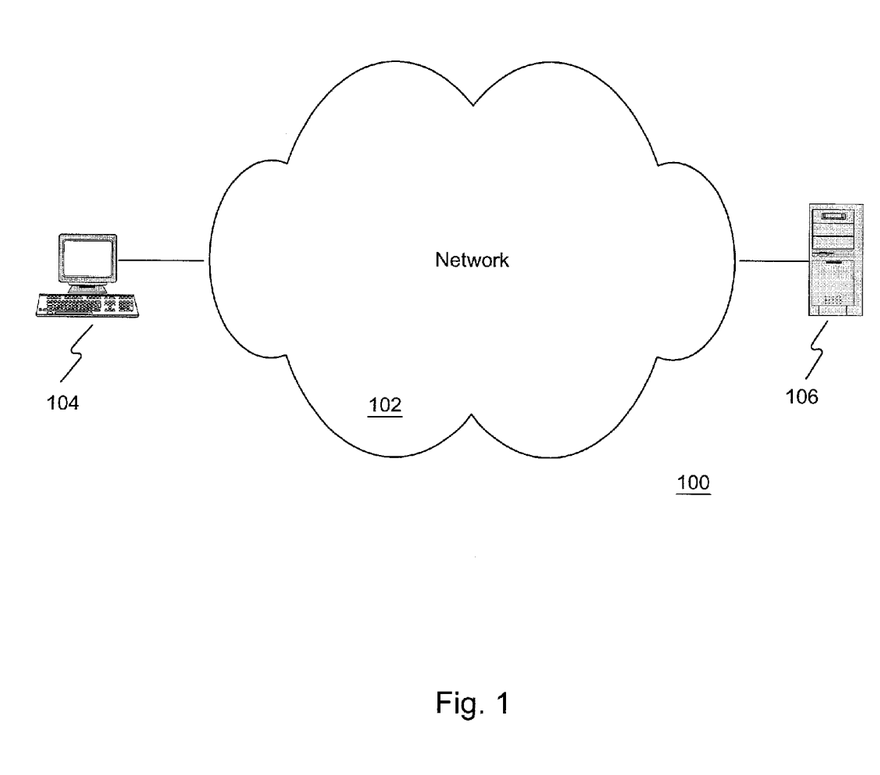
FIG. 1 illustrates a system, consistent with the principles of the present invention.

FIG. 1 illustrates a network or system 100, in accordance with methods and apparatus consistent with the present invention. As shown, system 100 includes a network 102, a client 104, and a server 106.

Network 102 provides a communications infrastructure for system 100. For example, network 102 may be a wide area network (WAN) or a local area network (LAN). Network 102 may be implemented using a variety of technologies alone or in combination, including wireline technologies, such as telephone, fiber optic cables, etc., and wireless technologies, such as radio frequency (RF), satellite, microwave. Furthermore, network 102 may support a variety of protocols including Internet Protocols (IP), Asynchronous Transfer Mode (ATM), Frame-Relay, Ethernet, etc.

Client 104 provides a platform for one or more assets. An asset may be any item of hardware or software. For example, client 104 may itself be a hardware asset, such as a personal computer, a laptop computer, a mobile phone, a personal digital assistant, or any device capable of executing program code. Client 104 may also include one or more additional hardware assets, such as a peripheral device. Furthermore, client 104 may include one or more software assets, such as an application program, a document created by an application program, or an operating system. In one embodiment, client 104 is implemented as a personal computer having a Pentium processor, a network interface card coupled to network 102, and using an operating system, such as Windows 2000 or Windows NT. Client 104 is further described with reference to FIG. 3.

Server 106 provides a platform for services used to track assets in an enterprise. For example, server 106 builds queries for asset tracking, distributes queries to asset 104 to request information, monitors processes for the queries, temporarily stores the information, provides a user interface for accessing the information, and provides reports. In one embodiment, server 106 is implemented on a known hardware platform using software, such as the Microsoft Internet Information Server. Server 106 is further described with reference to FIG. 2.

Figure 2:
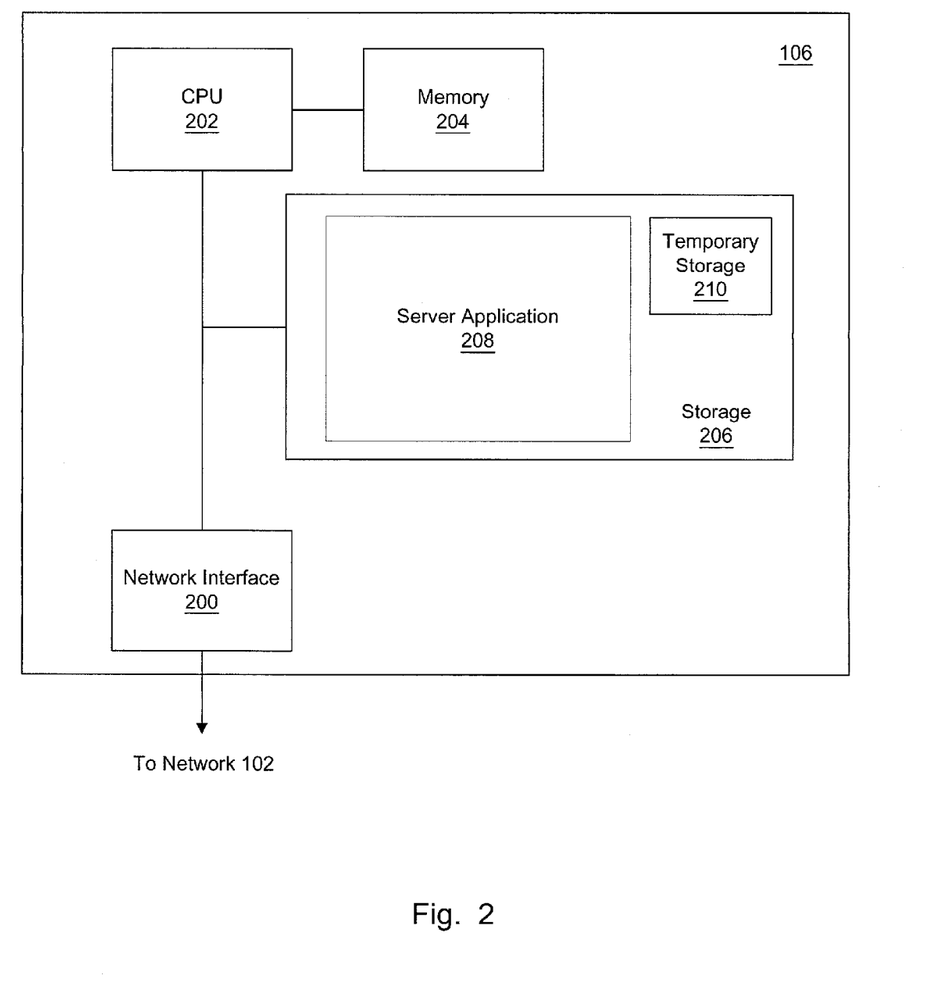
FIG. 2 illustrates a block diagram of a server, consistent with the principles of the present invention.

FIG. 2 illustrates a block diagram of server 106, consistent with the principles of the present invention. As shown, server 106 includes a network interface 200, a central processing unit ("CPU") 202, a memory 204, a storage 206, a server application 208, and a temporary storage 210.

Network interface 200 provides a communications interface between server 106 and network 102. For example, network interface 200 may be implemented using known technology, such as a modem, or port.

CPU 202 manipulates data and processes instructions, such as from server application 208, for server 106. CPU 304 may also include, for example, one or more of the following: a co-processor, memory, registers, and other processing devices and systems as appropriate.

Memory 204 provides a primary memory for CPU 202, such as a random access memory ("RAM"), and a read-only memory ("ROM"). Storage 206 stores data and information for later use and retrieval by server 106. Storage 206 may be embodied, for example, as a hard drive, an optical drive, a general-purpose storage device, a removable storage device, and/or other devices capable of storing information.

Furthermore, storage 206 may include server application 208 and temporary storage 210. Server application 208 provides instructions to CPU 202 for providing services for tracking assets. For example, server application 208 may implement one or more processes for tracking assets using program code. In one embodiment, server application 208 includes program code written in the Visual Basic programming language. Alternatively, server application 208 may include program code written in other programming languages such as C, C++, or C#. Server application 208 is further described with reference to FIG. 4.

Temporary storage 210 stores data and information for queries requesting information from the assets in system 100. Temporary storage 210 may be implemented as a cache within storage 206. Alternatively, temporary storage 210 may be implemented as a separate storage from storage 206.

Figure 3:
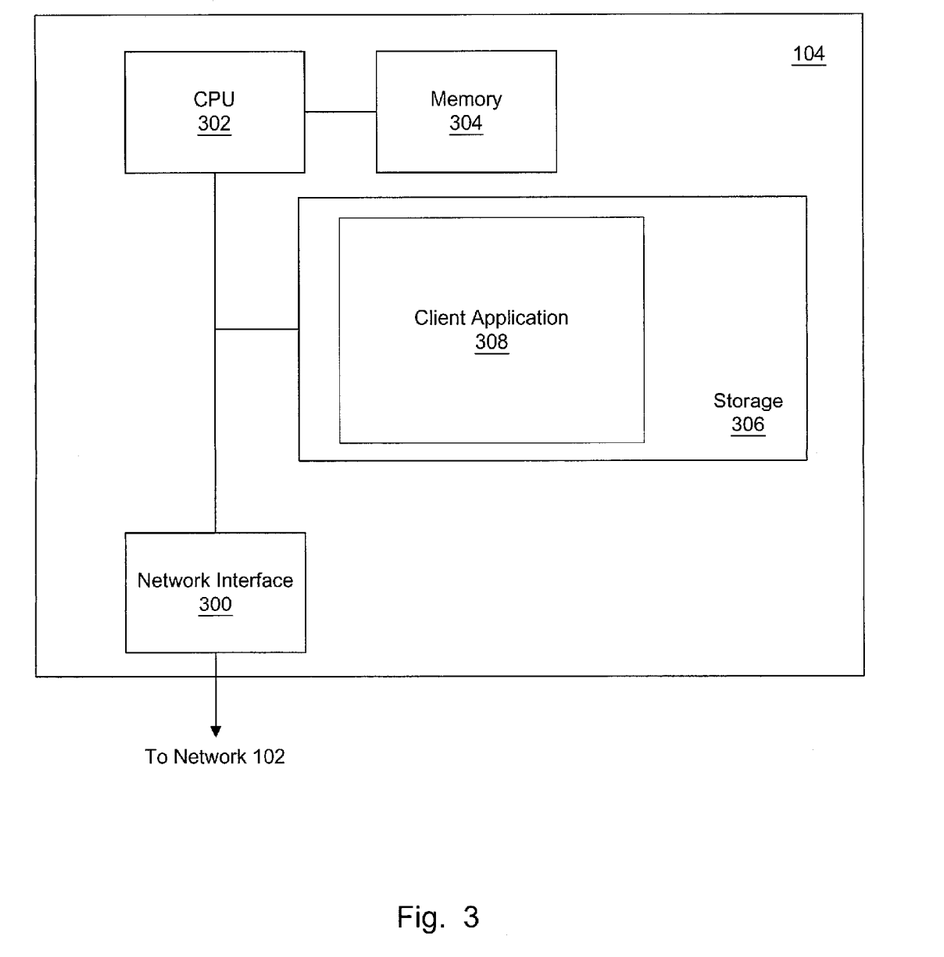
FIG. 3 illustrates a block diagram of a client, consistent with the principles of the present invention.

FIG. 3 illustrates a block diagram of client 104, consistent with the principles of the present invention. As shown, client 104 includes a network interface 300, a CPU 302, a memory 304, a storage 306, and a client application 308.

Network interface 300 provides a communications interface between client 104 and network 102. For example, network interface 300 may be implemented using known technology such as a modem, a network interface card, or a port.

CPU 302 manipulates data and processes instructions, such as from client application 308, for client 104. CPU 302 may also include, for example, one or more of the following: a co-processor, memory, registers, and other processing devices and systems as appropriate.

Memory 304 provides a primary memory for CPU 302, such as a random access memory ("RAM"), and a read-only memory ("ROM"). Storage 306 stores data and information, such as information for tracking assets, for later use and retrieval by client 104. Storage 306 may be embodied, for example, as a hard drive, an optical drive, a general-purpose storage device, a removable storage device, and/or other devices capable of storing information.

Furthermore, storage 306 may include client application 308, which provides instructions to CPU 302 for providing information for tracking assets on client 104. For example, client application 308 may implement one or more processes for providing information about assets on client 104. In one embodiment, client application 308 includes program code written according to the Visual Basic programming language. Alternatively, client application 308 may include program code written in other programming languages such as C or C++.

Client application 308 may be downloaded into storage 306 using a disk image from server 106. The disk image may be loaded onto client 104 using a diskette, or a compact disk, and/or downloaded over network 102. The disk image includes, for example, a copy of the program code for client application 308 required to provide information about assets on client 104. The disk image may be installed using a known installation program, such as Windows Installer Service 2.0. Client application 308 may also retrieve additional program code and configuration information from server 106. Client application 308 is further described with reference to FIG. 4.

Figure 4:
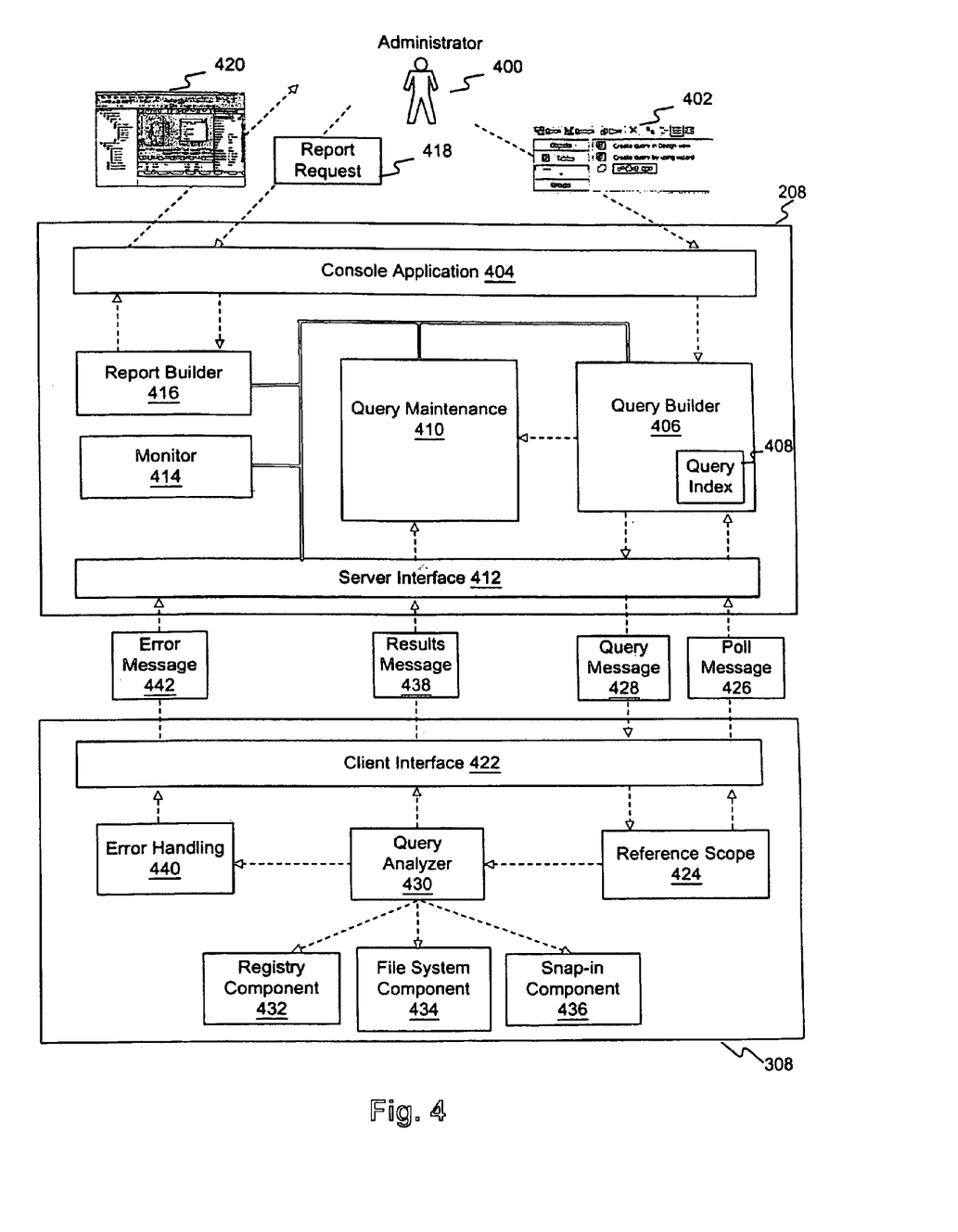
FIG. 4 illustrates an architecture for communications between a server application and client application, consistent with the principles of the present invention.

FIG. 4 illustrates an architecture for communications between server application 208 and client application 308, consistent with the principles of the present invention. As shown, an administrator 400 provides server application 208 a request 402 for a query. Server application 208 includes a console application 404, a query builder 406, a query index 408, a query maintenance component 410, a server interface 412, a monitor 414, and a report builder 416.

Request 402 includes information for creating the query. In one embodiment, administrator 400 specifies a lifetime, a scope, and one or parameters for the query in request 402.

The lifetime indicates a period of time for maintaining results of the query in temporary storage 210. In addition, the lifetime may indicate the length of time that client 104 should report any changes that concern the results of the query stored in temporary storage 210. When the lifetime expires, the results of the query are removed from temporary storage 210.

The scope identifies the assets on client 104 on which information is requested. For example, the scope may be an identification reference or portion of an identification reference identifying client 104, such as a Windows NT4 domain, an Active Directory reference, a Novell Directory Service reference, or a Lightweight Directory Access Protocol (LDAP) reference. For example, the scope may be a full LDAP reference, such as "cr.ric.cos", or "cr.bos.cos", or "cr.frd.cos". As another example, the scope may be a portion of an LDAP reference, such as "cr" that encompasses the LDAP references "cr.ric.cos", or "cr.bos.cos", or "cr.frd.cos". In addition, the scope may identify assets using other types of information, such as a name for a peripheral device, a serial number, an application name, an application file type, a registration number for an application, etc.

The parameters provide a criteria for the information requested in the query. For example, the parameters may be used to specify the conditions which satisfy the query. The parameters may specify information, such as a version number, a date, and a time, as conditions which must be satisfied.

Console application 404 allows administrator 400 to build request 402, view assets within system 100, monitor processes running on system 100, and monitor the progress of queries running on system 100. In one embodiment, console application 302 is implemented as a thin-client application that runs on a Microsoft Internet Information Server.

Query builder 406 assembles queries based on request 402. Query builder 304 selects one or more modules of program code executed by client 104 for the query, selects the properties of information requested in the query, and the assets and objects associated with the query.

In addition, query builder 406 updates query index 408 to reflect the query created for request 402. Query index 408 provides a master list of all queries currently supported by server application 208. In one embodiment, query index 408 includes a reference number identifying each query supported by server application, the scope for each query as specified in request 402, and the lifetime for each query as specified in request 402. Query index 408 is further described with reference to FIG. 5.

Query maintenance component 410 controls the temporary storage information received by server application 208. As information is received, query maintenance module 410 creates one or more temporary database tables in temporary storage 210 to hold the results of the query. However, when the lifetime for the query expires, the tables are removed. Upon expiration of the lifetime, query maintenance module 410 may discard the information stored in the tables or export the information so that it may be archived for later use.

Server interface 412 provides a communications interface for passing messages between server 106 and client 104.

Monitor 414 monitors the performance of components within server application 208 and the progress of queries as they are executed. For example, monitor 414 may determine an amount of asset resources available on client 104 based on, for example, memory or processor utilization, received from client 104.

Report builder 416 compiles reports for console application 404. Report builder 416 compiles reports based on parameters specified by report request 418. For example, report request 418 may specify the amount of time covered by a report, what assets are included in the report, what information is collected, and where to retrieve/store the raw information for the report. Report builder 416 may use the parameters in report request 418 and SQL-based queries to select information from temporary tables stored in temporary storage module 210. Report builder 416 may then provide an output screen 420 for the report to administrator 400. In addition, report builder 416 may store reports within temporary storage module 210, for later viewing.

Client application 308 includes a client interface 422, a reference scope 424, a query analyzer 430, a registry component 432, a file system component 434, a snap-in component 436, and an error handling component 440. Furthermore, client application 308 includes a manifest and version numbers for each component. In one embodiment, the version number is a 128-bit number that is presented as a set of four digits, such as 3.5.0.126. Client application 308 uses the version number to control compatibility between components executing within client application 308. For example, client application 308 may be configured to work only with components which have the same version number. Client application 308 may also be configured to work with components having a range of version numbers.

The manifest includes information indicating the components installed within client application 308. For example, the manifest may include a name for each component, a version number for each component, information indicating access rights for each component, and information indicating requirements for executing each component. Client application 308 may also request additional components to collect information for a query.

Reference scope 424 maintains reference information identifying assets on client 104. For example, reference scope 424 may identify assets based on information, such as a Microsoft NT4 domain name, an Active Directory reference, a Novell Directory Services reference, or Lightweight Directory Access Protocol Information. Reference scope 424 may identify assets on client 104 based on other types of information, such as user names indicated in a Microsoft Windows registry stored on client 104. The Microsoft Windows registry is a database used by Microsoft Windows to store information to configure client 104 for one or more users, applications, and hardware devices. For example, the registry includes information, such as applications installed on client 104, types of documents created by each user on client 104, property settings for folders and application icons, hardware installed on client 104, and communications ports being used by client 104.

Client interface 422 operates in conjunction with reference scope 424 to periodically poll server application 208. Client interface 422 may poll server application 208 based on any period of time, such as every 5 minutes. In addition, client interface 422 may poll server application 208 based on one or more events, such as after client application 308 has started up, after a system crash, or in response to a request from server interface 412.

Client application 422 polls server application 208 by sending a poll message 426. The poll message 426 includes information from reference scope 424 to identify client 104. In response to receiving the poll message 426, server interface 412 references query index 408. Server 412 then provides at least a portion of query index 408 within a query message 428.

In response to receiving query message 428, client interface 422 references reference scope 424 and query analyzer 430 to determine whether any queries are pending for one or more assets on client 104. Reference scope 424 may search the information from query message 428 to determine which queries have a scope encompassing client 104. For example, if client 104 belongs to a Novell Directory group named "OU.RIC.COS", then reference scope 424 may search for queries having a scope of "COS", "RIC.COS", "OU.RIC.COS", or "OU".

If queries are pending for one or more assets on client 104, then client interface 422 may send additional messages (not shown) to server interface 412 to request the pending queries. For example, the additional messages may include one or more query index numbers. In response, server interface 412 requests the pending queries from query builder 406 and provides them to client interface 422 using additional query messages, such as query message 428.

Query analyzer 430 then processes the pending queries received by client interface 422. In one embodiment, query analyzer 430 processes the pending queries based on a "live" query language ("LQL"). LQL is similar to structured query language ("SQL") queries, however, LQL queries information based on references to a file location (rather than based on relational keys in a table). The LQL query has the following general format.

PARAMETERS [Start of lifetime], [End of lifetime]
SELECT [File location]
FROM [Scope of query]
WHERE [Conditions for satisfying query]

PARAMETERS specifies a lifetime for the information requested in the query. The lifetime may be specified based on any time criteria, such as date, or time. SELECT specifies the criteria for accessing the requested information, such as a file name, or file system information. FROM specifies the scope for the query. For example, the scope may specify a range or groups of assets that are targeted by the query. WHERE specifies the conditions for satisfying the query.

For example, below is an exemplary LQL query.
PARAMETERS Jan. 1, 2002, Jan. 2, 2002
SELECT reg.user, fs.file ("Winword.exe"), fileversion, fs.file("Winword.exe"), LastAccessedDate as LastDate
FROM OU.RIC.COS
WHERE (fs.file("Winword.exe").fileversio >=8.0)

In this example, a lifetime from Jan. 1, 2002 to Jan. 2, 2002 is specified. The Microsoft Windows registry and file system directory are specified in the query for accessing information about the application named "Winword.exe" and the date when this application was last used. The query has a scope corresponding to a Novell Directory group named "OU.RIC.COS", and restricts the query to versions of 8.0 or higher.

In order to process the pending query, query analyzer 430 accesses one or more components, such as registry component 432, file system component 434, and snap-in component 436, to collect information for the query. Furthermore, query analyzer 430 may access the manifest for client application 308 to determine whether additional components are required to process the pending queries. If additional components are needed, client interface 422 may send a message, such as error message 442, to request additional components from server application 208.

Registry component 432 provides access to the Microsoft Windows registry stored on client 104. As noted above, the registry is a database used by Microsoft Windows to store information to configure client 104 for one or more users, applications, and hardware devices.

File system component 434 provides access to file system information for files stored on client 104. For example, file system component 434 may access the file system on client 104 for information, such as file names, file size, date a file was last modified, file type, when the file was created, an owner of the file, an author of the file, and a version for the file.

Snap-in component 436 provides access to other types of information in addition to registry and file system information. For example, snap-in component 436 may provide access to Basic Input/Output System ("BIOS") information, error reporting information indicating errors in the execution of one or more applications installed on client 104, information regarding system crashes of client 104, and information regarding memory or processor utilization.

In one embodiment, registry component 432, file system component 434, and snap-in component 436 are implemented as Microsoft assemblies of program code written according to the Visual Basic programming language. An assembly is a unit of program code, which may be unique to client 104 or exported for use by other program code outside of client application 308.

Upon collecting the information for the query, query analyzer 430 provides the results to client interface 422. Client interface 422 then sends a results message 438 to server interface 412. Server interface 412 then provides the results in results message 438 to query maintenance component 410.

Error handling component 440 handles errors occurring while client 104 is executing a query. Error handing component 440 includes one or more sets of rules to control execution of the query. In the event of an error or exception during a query, error handling component 440 creates an error report message 442. Error report message 442 may include information, such as information indicating a source of the error, and any information collected prior to the error. In response to receiving error message 442, server interface 412 may notify monitor 414. Monitor 414 may then provide an alert to administrator 400. Alternatively, monitor 414 may store the information in error report message 442 in storage 306.

Figure 5:
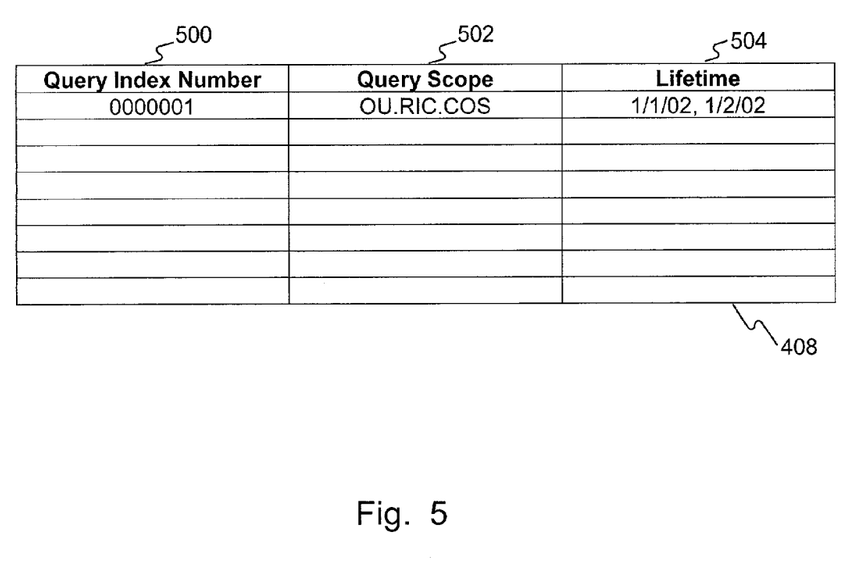
FIG. 5 illustrates a table for indexing queries, consistent with the principles of the present invention.

FIG. 5 illustrates query index table 408, consistent with the principles of the present invention. As shown, query index table 408 includes a query index number column 500, a query scope column 502, and a lifetime column 504.

Query index number column 500 provides information identifying each query currently supported by server application 208. Query index number column 500 may identify each query using a number, such as "0000001".

Query scope column 502 provides the scope for each query. For example, as shown in FIG. 5, the scope for query "0000001" is the Novell Directory group "OU.RIC.COS".

Lifetime column 504 specifies the lifetime for each query. For example, as shown in FIG. 5, the lifetime for query "0000001" begins on Jan. 1, 2002 and ends on Jan. 2, 2002.

Figure 6:
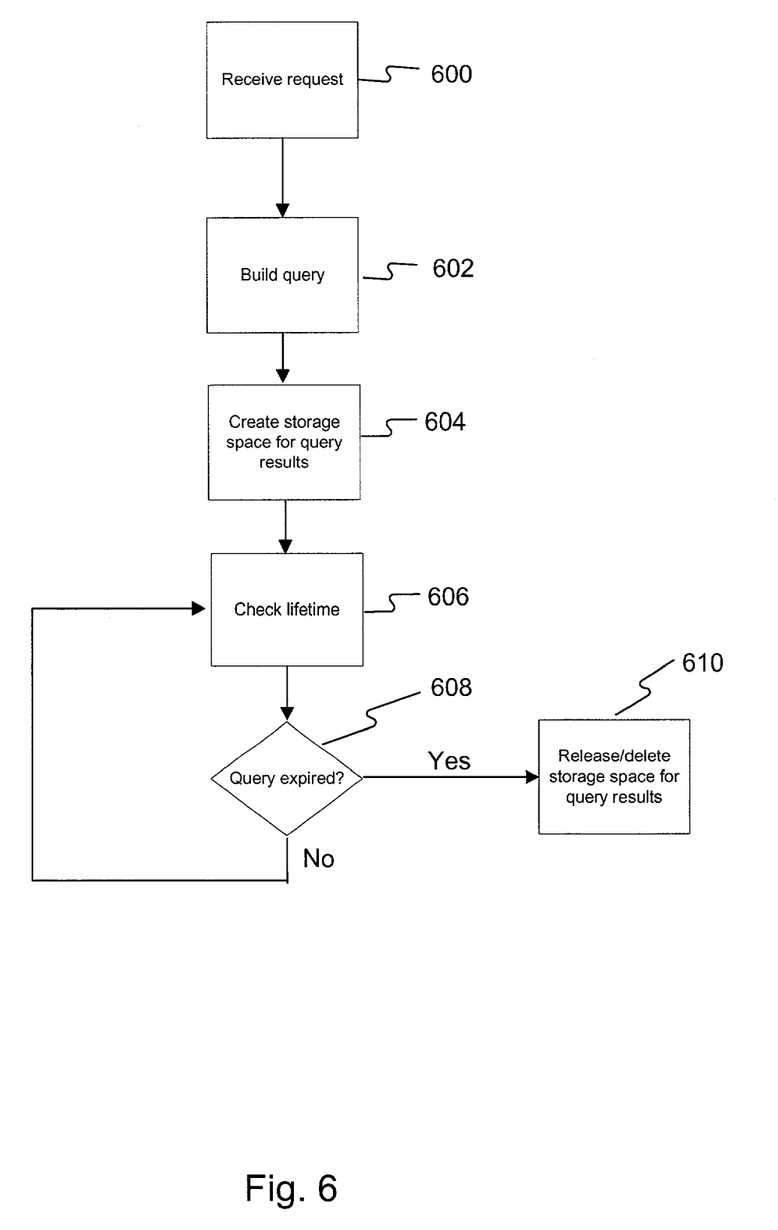
FIG. 6 illustrates a flow chart for maintaining information for tracking assets, consistent with the principles of the present invention.

FIG. 6 illustrates a flow chart for maintaining information for tracking assets, consistent with the principles of the present invention. In step 600, an administrator 400 accesses console application 404 to create query request 402. Query request 402 includes the lifetime, the scope, and one or more parameters for the query as requested by administrator 400. Console application 404 then provides query request 402 to query builder 406. For example, administrator 400 may request a list of all assets within the Novell Directory group "OU.RIC.COS", using Microsoft Word version 8.0 or higher, and a date for the last time of use. In addition, administrator 400 may request the information between Jan. 1 and 2, 2002.

In step 602, query builder 406 builds the query based on the information in request 402. Query builder 406 determines the lifetime, the scope, and parameters for the query. Query builder 406 then updates the appropriate columns in query index table 408. For example, query builder 406 may assign the query an index number of "0000001" in column 500, enter "OU.RIC.COS" as the scope of the query in column 502, and enter Jan. 1, 2002 and Jan. 2, 2002 as the lifetime of the query in column 504.

Furthermore, query builder 406 may create the following LQL query statement:

PARAMETERS [Jan. 1, 2002], [Jan. 2, 2002]
SELECT reg.user, fs.file ("Winword.exe"), fileversion, fs.file("Winword.exe"), LastAccessedDate as LastDate
FROM OU.RIC.COS
WHERE (fs.file("Winword.exe").fileversion>=8.0)

In step 604, query builder 406 notifies query maintenance module 410 to create storage space in temporary storage 210. For example, query maintenance module 410 may create one or more tables for the query.

In step 606, query maintenance module 410 checks the lifetimes for the queries supported by server application 208. In particular, query maintenance module 410 accesses query index table 408 and retrieves information from lifetime column 504.

In step 608, query maintenance module 410 determines whether the query has expired. For example, based on the information in lifetime column 504, query maintenance module 410 can determine whether the query has expired.

In step 610, if the query has expired, then query maintenance component 410 removes the storage created for that query. For example, query maintenance module 410 may delete the table created for the query. Alternatively, query maintenance module 410 may export any information stored in an expired table to another storage location or another computer. For example, query maintenance module 410 may export an expired table using extensible markup language ("XML") to another computer across network 102. If the query has not expired, then processing repeats at step 606.

Figure 7:
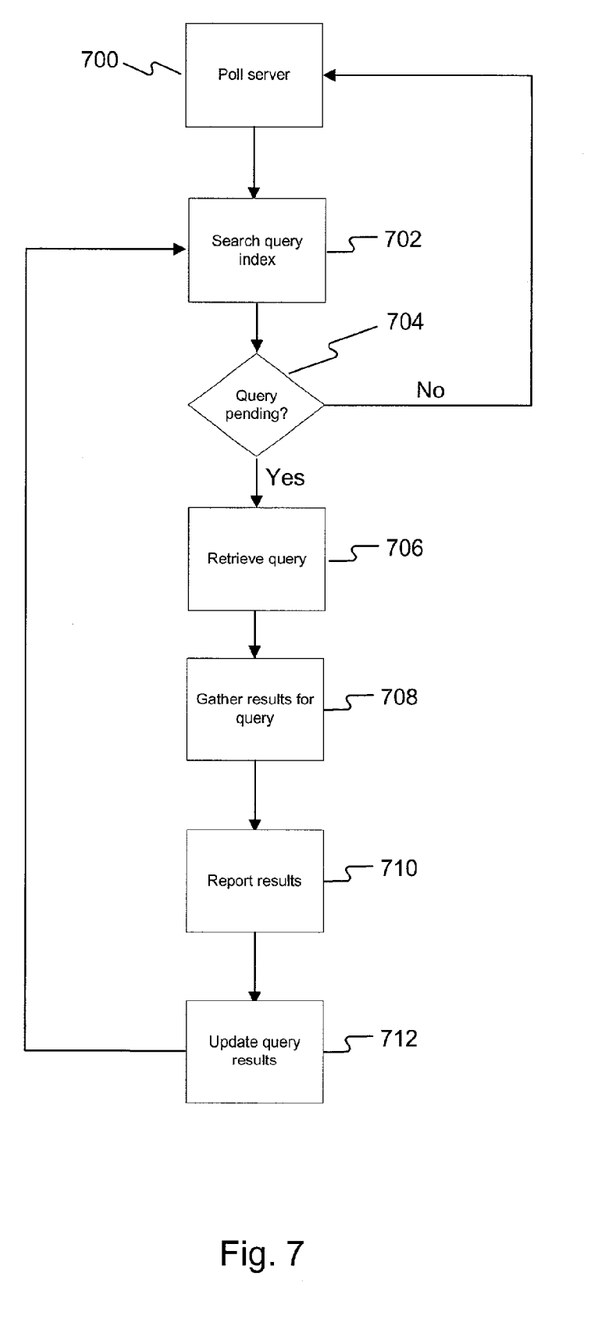
FIG. 7 illustrates a flow chart for querying a client for tracking assets, consistent with the principles of the present invention.

FIG. 7 illustrates a flow chart for querying a client for tracking assets, consistent with the principles of the present invention. In step 700, client interface 422 sends poll message 426 to server interface 422. Poll message 426 may include information from reference scope 424 for identifying client 104 to request pending queries. For example, poll message 426 may indicate that client 104 is a member of a Novell Directory group named "OU.RIC.COS". As another example, poll message 426 may indicate an organizational unit of which client 104 is a member, such as an LDAP organizational unit, a workgroup, or a domain. As yet another example, poll message 426 may indicate where an asset is stored on client 104, such as storage 306, or memory 304.

In step 702, server interface 412 searches query index table 408 based on the information in poll message 426. For example, server interface 412 may search query index table to find queries encompassing the Novell Directory group named "OU.RIC.COS".

In step 704, server interface 412 determines whether any queries are pending for client 104. If no queries are pending, then processing returns to step 700.

However, if a pending query is found, then processing flows to step 706. In step 706, client interface 422 retrieves the pending query from server application 208. For the present example, query index table 408 indicates that query number "0000001" is pending for the Novell Directory group named "OU.RIC.COS". Accordingly, server interface 412 sends query message 428 to client interface 422. Query message 428 includes the index number, for example, "0000001" for the pending query. Client interface 422 may then send one or more additional messages to server interface 412 to request the pending query. The additional messages may also include the query index number. In response, server interface 412 requests the query from query builder 406. Server interface 412 may then send another query message 428, which includes the query.

For example, query message 428 may include the following query:

SELECT reg.user, fs.file ("Winword.exe"), fileversion, fs.file("Winword.exe"), LastAccessedDate as LastDate
FROM OU.RIC.COS
WHERE (fs.file("Winword.exe").fileversion>=8.0)

In step 708, client interface 422 passes the query to query analyzer 430. Query analyzer 430 parses the query and accesses registry component 432, file system component 434, and (if necessary) snap-in component 436 to collect information for the query. Furthermore, query analyzer 430 may request additional components to collect information for the query. For example, query analyzer 430 may search the manifest for client application 308 to determine whether the appropriate components are currently loaded.

In step 710, client interface 422 reports the results of the query to server interface 412. For example, client interface 422 may send the results in results message 438 to server interface 412.

In step 712, server interface 412 provides the results to query maintenance module 410. Query maintenance module 410 accesses temporary storage 210 and, for example, updates the stored table to reflect the results reported from client 104. Processing then repeats again at step 700.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented by a computer, of tracking a configuration of hardware and software of an asset, comprising:

receiving, at a server, a request for information indicating the configuration of the hardware and the software of the asset;

distributing a query to the asset based on the request;

identifying a lifetime for the query based on the request;

selectively identifying, at the asset, the information indicating the configuration of the hardware and the software of the asset, based on the query;

receiving, at the server, the information indicating the configuration of the hardware and the software of the asset and selectively identified at the asset;

creating, at the server, a table based on the information indicating the configuration of the hardware and the software of the asset and selectively identified at the asset;

storing the information, indicating the configuration of the hardware and the software for the asset and selectively identified at the asset, in the table; and removing the table based on the lifetime, wherein removing the table based on the lifetime comprises:

determining whether the table has expired based on the lifetime for the query, archiving the expired table, and removing the table.

2. The method of claim 1, wherein selectively identifying information indicating the configuration of the asset, comprises:

identifying a scope in the query;

determining whether the asset is within the scope; and identifying information at the asset when the asset is within the scope.

3. The method of claim 2, further comprising:

discarding the query when the asset fails to be within the scope.

4. The method of claim 1, further comprising:

selecting information stored in the table; and providing a report based on the selected information stored in the table.

5. An apparatus for tracking a configuration of hardware and software of an asset, comprising:

means for receiving, at a server, a request for information indicating the configuration of the hardware and the software of the asset;

means for distributing a query to the asset based on the request;

means for identifying a lifetime for the query based on the request;

means for selectively identifying, at the asset, the information indicating the configuration of the hardware and the software of the asset, based on the query;

means for receiving, at the server, the information indicating the hardware and the software of the asset and selectively identified at the asset;

means for creating, at the server, a table based on receiving the information indicating the configuration of the hardware and the software of the asset and selectively identified at the asset;

means for storing the information, indicating the configuration of the hardware and the software for the asset and selectively identified at the asset, in the table; and means for removing the table based on the lifetime, wherein means for removing the table based on the lifetime comprises:

means for determining whether the table has expired based on the lifetime for the query, means for archiving the expired table, and means for removing the table.

6. The apparatus of claim 5, wherein the means for selectively identifying information at the asset comprises:

means for identifying a scope in the query;

means for determining whether the asset is within the scope; and means for identifying information at the asset when the asset is within the scope.

7. The apparatus of claim 6, further comprising:

means for discarding the query when the asset fails to be within the scope.

8. The apparatus of claim 5, further comprising:

means for selecting information stored in the table; and means for providing a report based on the selected information stored in the table.

* * * * *